US 6,573,695 B2

(12) United States Patent
Shashoua (10) Patent No.: US 6,573,695 B2
(45) Date of Patent: Jun. 3, 2003

(54) HIGH-EFFICIENCY POWER SUPPLY (75) Inventor: Meir Shashoua, Tel Aviv (IL)

(73) Assignee: K. S. Waves Ltd., Tel Aviv (IL)

( * ) Notice: Subject to any disclaimer, the term of this patent is extended or adjusted under 35 U.S.C. 154(b) by 0 days.

(21) Appl. No.: 09/928,921

(22) Filed: Aug. 13, 2001

(65) Prior Publication Data

US 2002/0089313 A1 Jul. 11, 2002

Related U.S. Application Data (60) Provisional application No. 60/225,179, filed on Aug. 14, 2000.

(51) Int. Cl.[7] .................................................. G05F 1/40
(52) U.S. Cl. ........................ 323/282; 327/554; 330/297
(58) Field of Search ........................ 323/282; 327/554; 330/297

(56) References Cited

U.S. PATENT DOCUMENTS

| 4,531,106 A | * | 7/1985 | Ganesan ...................... 333/173 |
| 4,574,250 A | | 3/1986 | Senderowicz ................ 330/258 |
| 5,289,137 A | | 2/1994 | Nodar et al. ................. 330/296 |
| 5,396,194 A | | 3/1995 | Williamson et al. ......... 330/297 |
| 5,414,614 A | | 5/1995 | Fette et al. |
| 5,581,454 A | | 12/1996 | Collins |
| 5,606,289 A | | 2/1997 | Williamson ................. 330/297 |
| 5,706,188 A | | 1/1998 | Meynard et al. |
| 5,737,201 A | | 4/1998 | Maynard et al. |
| 5,847,607 A | * | 12/1998 | Lewicki et al. ............. 330/258 |
| 5,914,638 A | | 6/1999 | He ............................... 330/258 |
| 5,942,880 A | * | 8/1999 | Akamatsu et al. ........... 323/210 |
| 5,969,513 A | * | 10/1999 | Clark .......................... 323/282 |
| 6,011,440 A | | 1/2000 | Bell et al. ................... 330/297 |
| 6,084,789 A | | 7/2000 | Van Lieshout |
| 6,373,340 B1 | * | 4/2002 | Shashoua .................... 330/297 |
| 6,400,211 B1 | * | 6/2002 | Yokomizo et al. .......... 327/536 |
| 6,400,214 B1 | * | 6/2002 | Aram et al. ................. 327/541 |
| 6,424,208 B1 | * | 7/2002 | Pinai ........................... 327/554 |

FOREIGN PATENT DOCUMENTS

| DE | 4107597 A1 | 9/1992 | |
| EP | 0856935 A2 | 8/1998 | |
| WO | WO 97/49175 | 12/1997 | ............. H03F/1/38 |
| WO | WO 99/05806 | 2/1999 | ........... H04B/14/06 |

OTHER PUBLICATIONS

Vanderkooy, J. and Hawksford, M.O.J., "Relationships between Noise Shaping and Nested Differentiating Feedback Loops", *Journal if the Audio Engineering Society*, vol. 47, No. 12, Dec. 1999.

* cited by examiner

Primary Examiner—Adolf Deneke Berhane
(74) Attorney, Agent, or Firm—Fitch, Even, Tabin & Flannery (57) ABSTRACT A high-efficiency tracking power supply featuring a network of switched capacitors and an active noise shaping unit for reducing non-linearity and controlling the noise spectrum. Several variations of a non-inductive switched-capacitor tracking power-supply are presented, which are well-suited to integrated-circuit implementation and battery operation, and which provide an efficient power supply for the output stage over a wide range of voltages that can exceed the voltage limits of the main power source. The output of the tracking power-supply can be fed into an analog linear voltage regulator, or can be used as a Multi-Level Quantizer for generating the output directly. Some simple switching strategies are disclosed which offer power efficiencies in excess of 90%.

13 Claims, 6 Drawing Sheets

| '1'-ABOVE TARGET '0'-BELLOW TARGET | | | CIRCUIT FORMED | CONNECTED SWITCHES | CHARGING CAPACITORS | DISCHARGING CAPACITORS |
| --- | --- | --- | --- | --- | --- | --- |
| C1 | C1 | C1 | | | | |
| 0 | 0 | 0 | $V_{dd}-C2-C3$ | S1,S2,S9,S12 | C1,C3 | |
| 0 | 0 | 1 | $V_{dd}-C1+C3$ | S1,S5,S10,S11 | C1 | C3 |
| 0 | 1 | 0 | $V_{dd}-C1+C2-C3$ | S1,S5,S7,S12 | C1,C3 | C2 |
| 0 | 1 | 1 | $V_{dd}-C1+C3$ | S1,S5,S10,S11 | C1 | C3 |
| 1 | 0 | 0 | $V_{dd}-C2-C3$ | S1,S2,S9,S12 | C2,C3 | |
| 1 | 0 | 1 | C1+C3 | S6,S3,S10,S11 | | C1,C3 |
| 1 | 1 | 0 | C1+C2-C3 | S6,S3,S7,S12 | C3 | C1,C2 |
| 1 | 1 | 1 | C1+C3 | S6,S3,S10,S11 | | C1,C3 |

HIGH-EFFICIENCY POWER SUPPLY

This application claims the benefit of prior provisional application No. 60/225,179, filed Aug. 14, 2000.

FIELD OF THE INVENTION

The present invention relates to power supplies in general, and, more particularly, to high-efficiency DC-to-DC converters, switching regulators, and tracking power-supplies.

BACKGROUND OF THE INVENTION

DC-to-DC converters are widely used today in many applications. Many of the efficient implementations are based on switching capacitors, and sometimes also inductors, and are referred to as switching regulators. Switching regulators that are based on capacitors only are becoming more popular since inductors are practically inconvenient for use especially where miniaturization and EMI is of concern.

Prior art switching regulators uses a two phase cycle. A charge-phase during which capacitors are charged while not being connected to the load, and a discharge-phase during which capacitors are discharged trough the load.

One problem associated with prior art switching regulators is that specific design parameters can only reach high efficiency within a relatively narrow range of output current and/or voltage requirements for applications where output current or voltage are changing significantly the efficiency of prior art switching regulators drops significantly.

Prior art methods to improve the ability to cope with a wide range of voltage/current requirements includes controlling the duty cycle between the charge and discharge phases, and/or controlling the resistance trough which the capacitors are charged during the charge-phase.

Another limiting factor of prior art implementations is that during the charge-phase there is power loss due the changing of the capacitor, that is proportions 1 to $\Delta V*C$.

In order to keep supplying power during the charge-phase, an output-capacitor is always connected at the output in parallel to the load. This output-capacitor needs to be charged to a voltage higher than the desired output voltage during the discharge-phase, so that it can keep supplying power during the charge-phase. This increases the ripple at the output of the power supply.

Another problem of current switching regulators is that the frequency content of the ripple (noise) at the output is dictated by the switching regulator circuit, and the power consumption, and can not be controlled to provide a noise frequency content that is more suitable for specific applications.

There is thus a widely recognized need for, and it would be highly advantageous to have, a high-efficiency power supply, that is capable of supporting a wide range of voltage/current requirements, while having low ripple with a controlled frequency content. These goals are met by the present invention.

REFERENCES

[1] EP0998795, WO9905806 "Method and apparatus for performance improvement by qualifying pulses in an oversampled, noise-shaping signal processor"

[2] EP0906659, WO9749175 "Oversampled, noise-shaping, mixed-signal processor"

[3] "Relationships between Noise Shaping and Nested Differentiating Feedback Loops", by J. Vanderkooy, and M. O. J. Hawksford, *Journal of the Audio Engineering Society*, Vol. 47, No. 12, November 1999.

TERMS AND DEFINITIONS

Tracking Power Supply—A power supply capable of providing a variable output voltage. According to the present invention, an efficient tracking power-supply is implemented, having control logic controlling a network of switching capacitors. By controlling the switches, different network connections can be made, giving rise to different electrical circuits. This allows creating multiple supply voltages with high efficiency at the load terminals, and monitoring voltages through the sensor terminals.

Multi-Level Quantizer—The above tracking power-supply can be viewed as a quantizer (a "multi-level quantizer") with multiple output levels possible during different time intervals, where the level changes during each time interval according to the voltages on the capacitors.

Network of Switched Capacitors—the network of switches and capacitors used in the tracking power-supply.

Network Connection—This is a specific set of connections, created by controlling the switches of the network of switched capacitors. This set of network connections creates an electrical circuit involving some or all of the capacitors, supplies, load terminals and sensor terminals.

Network State—The state of the network of switched capacitors at a certain time. The voltages across the capacitors define the network state.

1-Bit State—a specific case of a network state where a 1-bit state per capacitor indicates whether the voltage over it is higher or lower than some target voltage. This is useful when implementing the targeted capacitors selection algorithm.

Sensor—A sensor is any means of monitoring the network state while causing minimal affect. To monitor voltage over a certain capacitor, an appropriate network connection can be made by the control logic. A sensor for the 1-bit state can be the output of a comparator, comparing the voltage over the capacitor to the target voltage.

Estimated Network State—An estimated network state is a network state where some or all of the capacitor voltages are estimated rather than directly monitored.

Network Parameters—The network parameters include sufficient information about components involved in the network of switched capacitors. By way of example, this information may include electrical parameters of the load and main supplies, the capacitance of each capacitor, and the time intervals, whether absolute or relative. In certain embodiments of this invention, the control logic may need to know methods parameters in order to estimate, or predict, the estimated network state when direct monitoring is not feasible. The network parameters may be supplied to the control logic, or may be measured by the control logic through the sensor, whether during initialization time, during operation, or both.

Time Interval—A period of time during which the network connection is held fixed. The duration of such time intervals may be constant or variable, depending on the application.

Load Time Interval—A time interval during which the network connection involves the tracking power-supply output terminals.

Monitoring Time Interval—A time interval during which monitoring of the network state can be performed. A monitoring time interval can overlap a load time interval.

Control Logic—Logic controlling the network of switched capacitors via the switches, in order to create a desired network connection. The main task of the control logic is to determine the best network connection involving the load at any time interval. The control logic implements a selection algorithm, and attempts to minimize the value of the target function, while conforming to some other criteria. The control logic may be implemented fully in the digital domain, while monitoring the state of the network of switched capacitors through the sensor. Alternatively, the control logic can be implemented in the analog domain. The control logic unit has one or more inputs and one or more control outputs.

Target Function—At each load time interval, there is an ideal desired output from the tracking power-supply. Since in general the tracking power-supply cannot provide this output exactly, the target function is a 'cost' function that associates a cost with each possible output from the tracking power-supply during the current load time interval. The control logic uses this function as part of the selection algorithm to determine the best network connection for the current load time interval.

Selection Algorithm—The selection algorithm applied by the control logic tries to minimize the target function, while applying additional considerations as well. Such considerations can be of different natures, including, without limitation, minimizing the number of switching operations taking place, keeping voltages on capacitors within certain ranges, keeping voltages on capacitors close to a target voltage, maintaining certain characteristics of the power stage, and so forth.

Constrained Capacitors—A selection algorithm according to which each capacitor has a target voltage range, and where the capacitor is not allowed to be connected such that it would charge when the voltage across it is above its target voltage range, and vice versa.

Targeted Capacitors—A selection algorithm according to which each capacitor has a target voltage, and where the capacitor is not allowed to be connected such that it would charge when the voltage across it is above its target voltage, and vice versa.

Target Error—The error, in the case of the targeted capacitor selection algorithm, of the actual average voltage supplied by a capacitor during a load time interval relative to that capacitor's target voltage.

Power Stage—The final stage of the power supply. Embodiments of the present invention describe a linear power stage and a discrete power stage.

Linear Power Stage—A power supply according to the present invention having an analog voltage regulator as the final power stage, where the power-supply is a tracking power-supply. The advantage of this approach is that it reduces the noise generated by the tracking power-supply at the final output.

Discrete Power Stage—A power supply according to the present invention having no analog power stage, where the tracking power-supply is connected directly to the power supply output, and acts as a Multi-Level Quantizer. In this approach, the noise-shaping loop handles all noise. No linear-analog power components are used, and this is an advantage in certain cases.

Noise-Shaping Loop—A feedback and filtering network that causes the noise energy (whether non-linear errors correlated with the input, or uncorrelated noise) to reside in frequencies where the noise poses no problem. In one embodiment of the present invention, the noise-shaping loop may be implemented entirely in the analog domain, around the power stage. Alternatively, in another embodiment of the present invention, the noise-shaping loop may be implemented entirely in the digital domain before the power stage, based on information supplied by the control logic. In yet another embodiment, the noise-shaping loop may be implemented as a hybrid digital-analog domain using an A-to-D converter to convert analog feedback from the output of the power stage into the digital domain.

Linear Quantizer—The Selection algorithm described in "$2*N+3$ Level Quantizer using $N$ Capacitors and the Targeted Capacitors Selection Algorithm" below.

Binary Quantizer—The Selection algorithm described in "$1+2^{(N+1)}$ Level Quantizer using $N$ Capacitors and the Targeted Capacitors Selection Algorithm" below.

Conversion Ratio—The ratio of the voltage desired at the output of the power supply, to the voltage of the main power supply.

SUMMARY OF THE INVENTION

The main goal of the present invention is to improve the efficiency performance of switching power supplies, in order to reduce electrical power consumption. Another goal is to support a wider range of output current/voltage requirement with the same power supply, while maintaining the efficiency. Another goal is to better control the frequency content and amplitude of the ripple at the output of the power supply. Another goal is to provide, for a power supply that can track fast changes in output voltage requirements, thus implementing an efficient tracking power supply. Yet another goal is to provide for a power supply that can regulate a main power source that is not stable.

According to the invention, a network of switches and capacitors is used to create a desired voltage at the load terminals of a power supply, by configuring different circuits between the load terminals involving one or more of the main power supplies and the capacitors.

A novel aspect of this invention is that the circuits are arranged such that capacitors will always charge and/or discharge trough the load, thus eliminating the need for a charge-phase that is not involving the load. Because both charging and discharging of the capacitors is done trough the load, and involving the same load current, the amount by which capacitors are charged and discharged is automatically balanced eliminating the need to specifically control the durations of charge and discharge phases, and the resistance during charge phases.

Another novel aspect of the present invention is the use of an integral feedback control and noise-shaping unit to control the frequency content of the switching noise and ripple at the output.

This innovation describes a tracking power-supply that is easy to design as well as inexpensive to manufacture and use, and which is well-suited for integrated circuitry.

Two major applications are treated in this invention.

First application is where conversion with a fixed Conversion Ratio from a main power source is desired.

Second application is where conversion with a variable Conversion Ratio from a main power source is desired, weather the desired output voltage changes, or the main supply voltage is changing, or both are changing.

Four different types of embodiments are described according to this invention. All embodiments use the Network of Switched Capacitors as the mains to provide a desired level at the output. The differences between the different embodiments are in the use of other supporting circuitry such as an analog linear regulator stage, and noise-shaping feedback loop.

In some embodiments the output from the Network of Switched Capacitors is used directly as the output in other embodiments a feedback noise shaping loop from the output is used to control the frequency content of the ripple and noise at the output of the Network of Switched Capacitors. In other embodiments a linear regulator is connected to the output of the Network of Switched Capacitors to regulate the ripple and noise at the output. Other embodiments uses both linear regulator as well as a noise shaping feedback loop.

Figure 5:
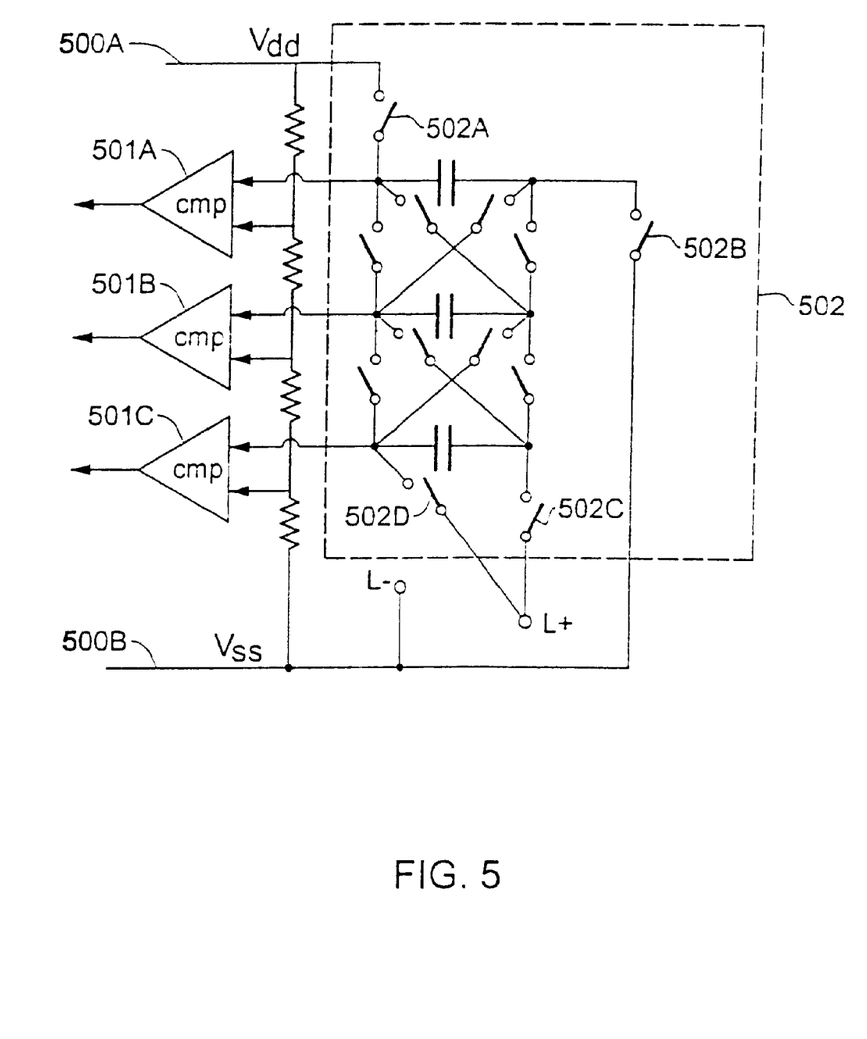
FIG. 5 is a block diagram of a generic Network of Switched Capacitors capable of supplying an output voltage that is always referenced to a common ground.

An embodiment example of a Networks of Switched Capacitors with output voltage that is always reference to a common ground, is shown in FIG. 5.

In many cases of a power supply only one, or few. DC output voltage is required, rather than any output voltage. Thus the complexity of the Network of Switched Capacitors can be significantly reduced, compared with that needed to support a generic tracking power supply.

Figure 1:
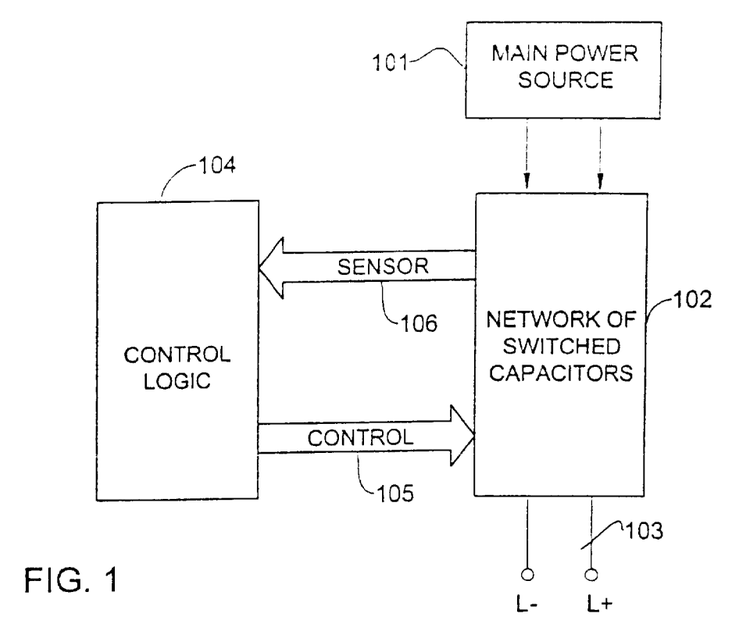
FIG. 1 shows a basic block diagram of a switched-capacitor power supply with a fixed Conversion Ratio according to the present invention.

FIG. 1 is a general block diagram illustrating the basic configuration of a power supply according to the invention, that is suitable for supplying an output voltage that is within a fixed Conversion Ratio to a main power source.

The main power source 101, is connected to the Network of Switched Capacitors 102, that provides the output voltage trough the load terminals 103 (L+, L−). A control logic 104 is controlling the switches of the Network of Switched Capacitors trough the Control outputs 105, and according to the Sensor inputs 106 from the Network of Switched Capacitors. Since the Conversion Ratio of the output voltage to the main power source is fixed, no control input is needed to control the output voltage, rather the control logic creates the Network Connections to always provide for the same Conversion Ratio at the load terminals.

In the embodiment of FIG. 1, the output will have ripple whose amplitude is dependent on the capacitance of capacitors in the Network of Switched Capacitors, the switching frequency, and the current consumed by the load. As explained above, because the capacitors both charge and discharge by the same current that is consumed by the load, the ripple will always be optimal for the given parameters. The frequency content of the ripple is not controlled in this embodiment.

Since a constant Conversion Ratio to the main power supply is needed at the load terminals, the most efficient Selection Algorithm can be determined by which method provides the closest Conversion Ratio to the desired one, with the most efficient network. For example if the desired Conversion Ratio is 1/3 or 2/3, the most efficient selection algorithm will be the Linear Quantizer, where N=2. If for example the desired Conversion Ratio is 1/4, or 3/4, the most efficient selection algorithm will be the Binary Quantizer, with N=2.

It is also possible to recursively combine several Linear Quantizers and Binary Quantizers in order to achieve efficient Networks that will provide ratios that are multiples of the individual ratios of each Network. This is done recursively by combining the Networks such that the output of one Network serves as the supply for another Network. For example, for a desired Conversion Ratio of m/9 (where m<9) two Linear Quantizers can be combined, the first with N=2 and Target Voltages 1/3 and 2/3, and the second with N=2 and Target Voltages of 1/9 and 2/9. A desired Conversion Ratio of m/12 (where m<12) can be achieved by combining a Linear Quantizers with N=2 and Target Voltages 1/3 and 2/3, and a Binary Quantizer with N=2 and Target Voltages of 1/(3*2) and 1(3*4).

In such embodiments the Network of Switched Capacitors consists of groups of capacitors and Target Voltages according to the Linear Quantizer or Binary Quantizer methods, where one group refers to the main power supply, and the other groups refer to one of the possible quantizer output levels of the former groups as it's main power supply recursively. It can be proven similarly to the proof in Binary Quantizer below, that all such combinations are always possible to generate while conforming to the Targeted Capacitors Selection Algorithm.

Figure 2:
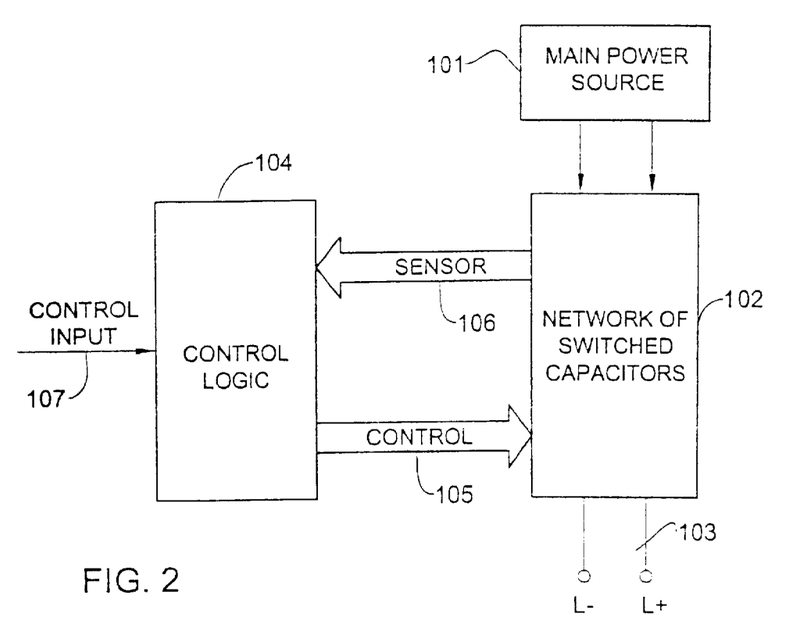
FIG. 2 shows a basic block diagram of a switched-capacitor power-supply with a variable Conversion Ratio according to the present invention.

Another embodiment of the current invention is shown in FIG. 2. This embodiment allows for a variable Conversion Ratio, by adding a control input to the Control Logic. The power supply according to the invention can act as a Tracking Power Supply, and track the control input.

Figure 3:
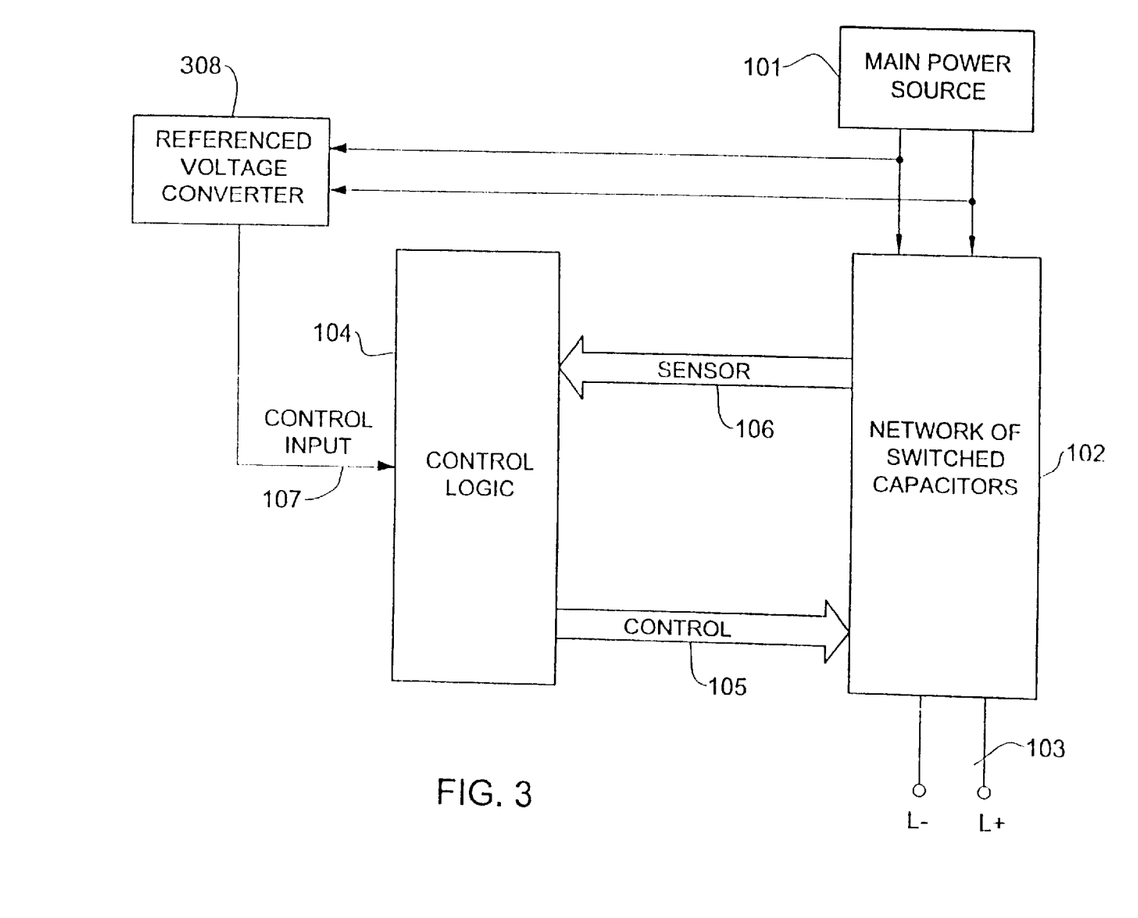
FIG. 3 shows an example of a basic block diagram of a switched-capacitor power-supply with a variable Conversion Ratio capable of regulating a none-stable main power supply according to the present invention.

Another embodiment of the invention is shown in FIG. 3. In this embodiment the main power supply is not stable, and the desired output voltage is a stable (regulated) DC voltage. A referenced voltage converter 308 is monitoring the main power supply voltage, and supplies it as the control input. The Control Logic will adjust the Conversion Ratio such that the output will remain stable at the desired output voltage. By way of example, the referenced voltage converter may consist of a network of resistors to divide the main power supply voltage, and an A-to-D converter with an internal absolute voltage reference.

Figure 4:
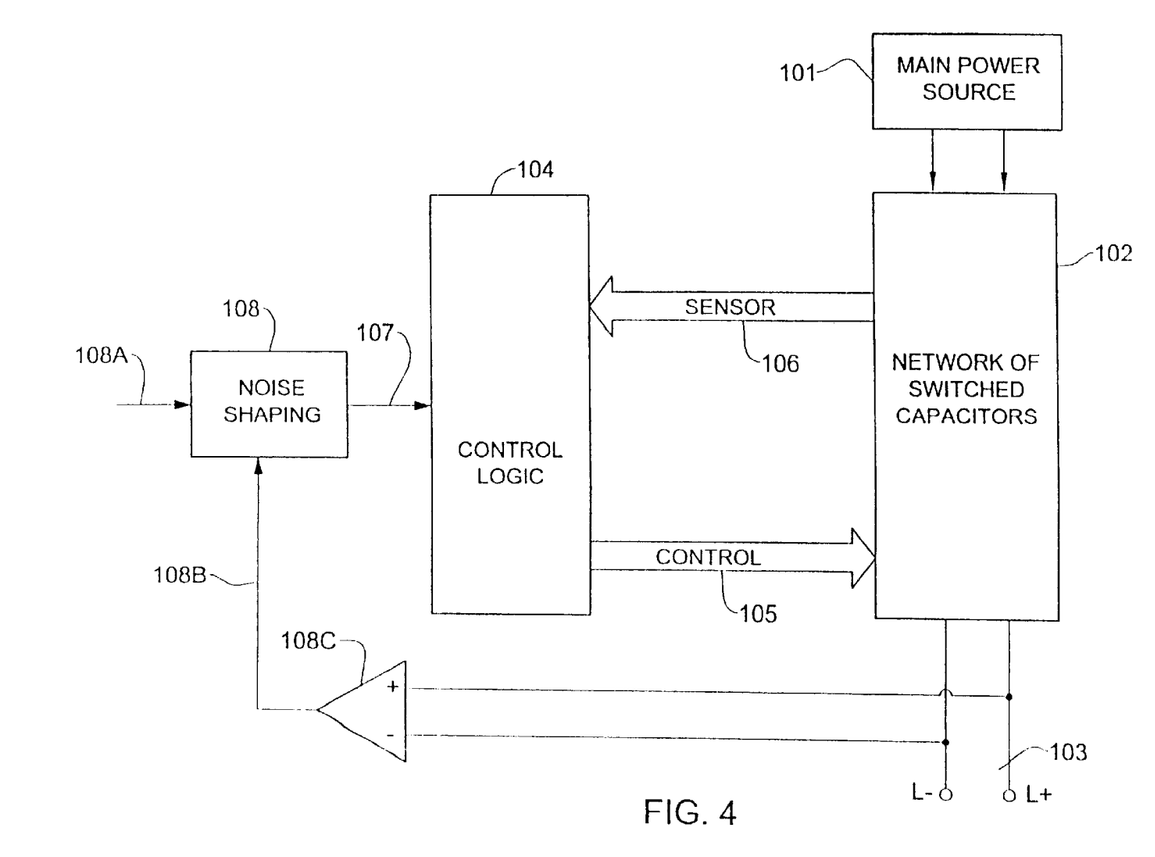
FIG. 4 shows an example of a basic block diagram of a switched-capacitor power-supply, with a variable Conversion Ratio and a noise shaper, capable of regulating a none-stable main power supply, as well as controlling the spectrum of ripple and noise at the power supply outputs according to the present invention.

FIG. 4, shows another embodiment of the invention where a noise shaper 108 and feedback loop is added around the power supply, and controls the output voltage trough the control input 107. The noise shaper 108 has a reference input 108A, this reference input is related to the desired output voltage, weather it is a constant DC voltage, or a variable voltage. The feedback from the load terminals is fed trough a buffer 108C to the feedback input 108B of the noise shaper 108. By having this feedback and noise shaping configuration few goals are achieved:

The power supply output voltage will not be sensitive to instabilities or noise of the main power supply thus it acts as a voltage regulator.

The frequency spectrum of the ripple and noise at the power supply output are controlled to reside in such frequencies where it will not pose a problem to the load for a given application.

A general reference for noise shaping loops in both the analog and digital domains is [3].

In another embodiment of this invention a linear voltage regulation can be added at the output of the Network of Switched Capacitors. This will further reduce ripple and noise of the power supply. The output voltage from the Network of Switched Capacitors can be adjusted to be close enough to the desired final output so that the power dissipation over the linear voltage regulator is small. To add a linear voltage regulator at the outputs of the embodiments of FIGS. 1 and 3 is straight foreword.

FIG. 5, shows a possible implementation of the Network of Switched Capacitors suitable for the Targeted Capacitors Selection algorithm that is capable of supplying an output voltage that is always referenced to a common ground. The main power supply has two supply terminals $V_{dd}$ and $V_{ss}$ 501A and 501B respectively, where $V_{ss}$ is the common ground. One of the load terminals L− is permanently connected to $V_{ss}$ as the common ground. The comparators 501A–C provides the sensor inputs to the Control Logic, in this case these are 1Bit State signals. The network of switches and capacitors 502 allows for configuring any combination of sum and difference of the voltages over the capacitors by cascading any desired number of the available capacitors with the desired polarity. Using the switches 502A–D the load terminal L+ can be connected to have any of the following voltages with reference to L–:

$$L+=A_0V_{dd}+A_1{}^*C_1+\ldots+A_n{}^*C_n$$

Where: $A_0$, $A_1$ are 0 or 1, and $A_2 \ldots A_n$ are –1 or 0 or 1, and $C_1$ being the capacitor with the highest Target Voltage.

For those skilled in the art it is evident that when the desired Conversion Ratio requires only a subset of the possible above combinations, than switches that are never used can be omitted from the circuit of FIG. 5, in order to simplify it.

According to the present invention, the Network of Switched Capacitors approximates a Multi-Level Quantizer. In order to implement a Multi-Level Quantizer, it is necessary to generate multiple voltage levels. According to the present invention, an efficient way to generate multiple voltages from one power supply is by using the same network of switched capacitors as in the tracking power-supply previously described. The target function for the control logic in this case is simply to produce the level closest to the signal at the input of the Multi-Level Quantizer. Other constraints can be added in the control logic, as will be described below by way of a non-limiting example regarding the Constrained capacitor or targeted capacitors selection algorithms.

Therefore, according to the present invention there is provided a power supply receiving electrical energy from a primary source of electrical energy having a $V_{ss}$ source voltage and a $V_{dd}$ source voltage, and supplying output power via load terminals, the power supply comprising a Network of Switched Capacitors containing at least one capacitor for storing electrical energy, such of said at least one capacitor having a voltage thereon, wherein said Network of Switched Capacitors is operative to configuring electrical circuits between said load terminals such that said at least one capacitor substantially charge or discharge trough said load terminals, and wherein said electrical circuits include voltages and components selected from a group containing a) the $V_{ss}$ source voltage, b) the $V_{dd}$ source voltage, and c) a non-negative number of capacitors of said Network of Switched Capacitors.

BRIEF DESCRIPTION OF THE DRAWINGS

The invention block diagram is herein described, by way of example only, with reference to the accompanying drawings, wherein.

DESCRIPTION OF THE PREFERRED EMBODIMENTS

The principles and operation of a power supply according to the present invention may be understood with reference to the drawings and the accompanying description.

In some of the following embodiments, the combination of the tracking power-supply, and specifically the type of tracking power-supply described herein, with the feedback control and noise-shaping unit around the power stage is essential. Otherwise the switching noise and common mode noise created by the tracking power-supply can be unacceptable.

Figure 7:
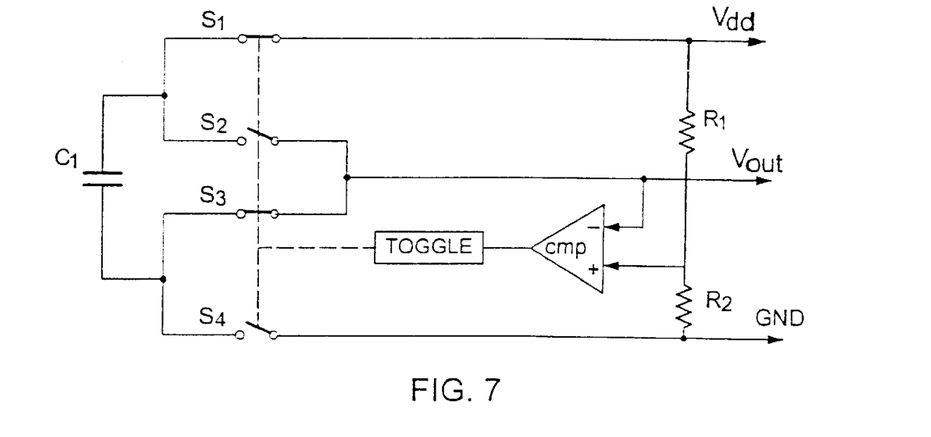
FIG. 7 shows a block diagram of a DC-to-DC voltage converter with a Conversion Ratio of 0.5 according to the invention.

The embodiment of FIG. 7, shows a block diagram of a DC-to-DC voltage converter with a Conversion Ratio of 0.5 according to the invention. In this embodiment the target voltage for the capacitor C1 is 0.5 $V_{dd}$ that is also the desired output R1 and R2 are resistors with equal resistance, thus the comparative cmp1 compare $V_{out}$ to it's target $0.5*V_{dd}$, and provides the 1 Bit State to the Toggle logic. In this embodiment, the output of cmp1 is the sensor, and the Toggle is the Control Logic. The four switches S1 to S4 can be in one of two states. During state1, both S1 and S3 are connected and both S2 and S4 are disconnected, thus $V_{out}=V_{dd}-C1$. During state2, both S2 and S4 are connected and both S1 and S3 are disconnected, thus $V_{out}=C1$. Whenever $V_{out}$ is lower than $0.5*V_{dd}$, the Toggle will toggle the state of the switches. This way if C1 is charged to >0.5 $V_{dd}$, and the switches are at state2, they will remain in this state, and C1 will discharge trough the load, until the voltage over C1, and thus $V_{out}$, will fall below $0.5*V_{dd}$. At this stage the Toggle will change the switches to state1 and Vout will be <0.5 $V_{dd}$ again, since C1<0.5 Vdd, and $V_{out}=V_{dd}-C1$. Now C1 will charge trough the load, until the voltage over C1 will rise above $0.5*V_{dd}$, and thus $V_{out}=V_{dd}-C1$ will fall below $0.5*V_{dd}$, and so on.

Switched-Capacitor Tracking Power-Supply

According to the invention, and as illustrated in FIGS. 1 to 5, tracking power-supply 102 is implemented using one or more switches and capacitors 502 along with the primary power source 101. The purpose of capacitors 502 is to store electrical energy and act as voltage supply sources. At each instant, capacitors 502 and the primary power source outputs 101 form a group of possible voltage supply sources. Control logic unit 104 examines the state of the whole system, and periodically selects one of the possible Network Connections to create the desired output voltage at the load terminals. No resistors or inductors are used. Depending on the selection made by control logic unit 104, some of capacitors 502 may be charged or discharged through output load 103 so that there be no loss of energy within tracking power-supply 102. By applying a selection algorithm, control logic unit 104 can maintain a desired network state.

The explanation of the embodiment of FIG. 7, above illustrates the operation of the switched-capacitor tracking power-supply for a simple case of fixed Conversion Ratio. In cases where the output voltage needs to be changed, the Control Logic finds periodically the combination of capacitors that is best matches the desired output voltage.

Selection Algorithm

The accuracy of the tracking of the tracking power-supply directly affects the resulting efficiency, and thus the instantaneous goal of the selection algorithm is to minimize the target function. On the other hand, because the capacitors are charged and discharged only while selected, longer term considerations should also be applied to guarantee a good network state and the availability of enough choices during future time intervals. Thus, the selection algorithm for selecting the capacitor switching is critical for the resulting efficiency. Efficient selection algorithms may involve knowing the input signal statistics, predicting the input signal, and complex decision strategies. Some selection algorithms for selection are presented below.

Free-Running Capacitor Selection Algorithm

In an embodiment of the present invention, a selection algorithm simply minimizes the target function. This selection algorithm is herein denoted by the term 'free-running capacitor'. Empirical statistical simulations show that with typical speech as an input signal, the free-running capacitor selection algorithm will yield about 70% efficiency using three capacitors.

Constrained Capacitor Selection Algorithm

In another embodiment of the present invention, a more sophisticated selection algorithm tries to keep the voltages across the capacitors within a predefined range of voltages. This selection algorithm is denoted herein by the term 'constrained capacitor'. To achieve this target, another condition is imposed, whereby a capacitor can be selected such that the voltage across it will increase only when the that voltage is below the allowed range. Likewise, a capacitor can be selected such that the voltage across it will decrease only when that voltage is above the allowed range. The determination of the voltage ranges for each capacitor is critical for the success of this selection algorithm. Because each capacitor eventually stays within a range, it can be shown that, starting from initial conditions where each capacitor is within range, the average current through this capacitor will be zero, and so will be the average current through all capacitors combined. It can be shown that for this condition to be satisfied while still being efficient, it is required that approximately the same output voltage be generated in at least two ways. One way is such that the overall charge on all capacitors will increase, and another way is such that the overall charge on all capacitors will decrease.

Targeted Capacitor Selection Algorithm

In another embodiment of the present invention, a simplification of the constrained capacitor selection algorithm is to try to keep the voltages across the capacitors sufficiently close to a target voltage. This selection algorithm is herein denoted by the term 'targeted capacitor'. To achieve this, a condition is imposed on the selection algorithm, whereby a capacitor can be selected such that the voltage across the capacitor will increase only when that voltage is below the target voltage. Likewise, a capacitor can be selected such that the voltage across the capacitor will decrease only when that voltage is above the target voltage.

A convenient property of the targeted capacitors selection algorithm is that in order to implement it, only a 1-bit state per capacitor is needed to be known, indicating whether the voltage on each capacitor is above or below the target voltage. Such a 1-bit state can be generated by comparators that compare the voltage over each capacitor to the respective target voltage.

Estimation of the Average Output Voltage from each Capacitor for the Targeted Capacitors Selection Algorithm The term 'target error', herein denotes the error of the actual average voltage supplied by a capacitor during a load time interval relative to the capacitor's target voltage. A convenient property of the targeted capacitors selection algorithm (detailed above) is that the deviation of each capacitor's voltage from the respective target voltage can be guaranteed not to exceed a predetermined maximum deviation. This is because, over any time interval during which a capacitor discharges, the initial voltage on that capacitor is equal or higher than the respective target voltage, and depending on the network parameters, there is a limit on how much the capacitor can discharge by the end of the time interval. The same applies to any time interval during which a capacitor charges. Thus the voltage over each capacitor will vary around the respective target voltage, and the capacitance, the load impedance, and the switching time intervals can be chosen such that the deviation of the capacitor voltage from the target voltage is guaranteed not to exceed a predetermined maximum deviation. If the voltage over a capacitor is above target, for example by the above-mentioned maximum deviation, then during the next load time interval where this capacitor is used, the capacitor will discharge. Thus, the average voltage supplied by the capacitor over the whole time interval is closer to the target voltage than the above-mentioned maximum deviation. Therefore, the target error is smaller than the maximum deviation, and can be very close to zero if the voltage across the capacitor crosses the value of the target voltage during the load time interval.

Hence, by using the targeted capacitors selection algorithm, the network of switched capacitors can be designed such that a capacitor's target voltage serves as a good estimate of the capacitor's average output voltage. This property is useful in providing a good estimated network state with a simple 1-bit state sensor.

2*N+3 Level Quantizer using N Capacitors and the Targeted Capacitors Selection Algorithm We term this method as Linear Quantizer. It can be proven that, using the targeted capacitors selection algorithm where the target voltages for each capacitor are evenly distributed between $V_{dd}$ and $V_{ss}$; and where the network of switched capacitors is capable of creating at least the group of voltages 0, $\pm(V_{dd}-V_{ss})$, $\pm(V_{dd}-V_{ss}-C_n)$, $\pm(V_{dd}-V_{ss}+V_n-C_m)$, $\pm(C_n)$, $\pm(C_m)$ between the tracking power supply output terminals; then at any given moment it is possible to create any output voltage from the group $\pm//(N+1)*(V_{dd}-V_{ss})$ up to the target error, where $0>/\leq N+1$, and where N equals the number of capacitors. This provides a behavior similar to that of a quantizer with 2*N+3 quantization levels.

$1+2^{(N+1)}$ Level Quantizer using N Capacitors and the Targeted Capacitors Selection Algorithm We term this method as Binary Quantizer. Using the targeted capacitor selection algorithm where the target voltages for the capacitors are distributed as a series of negative powers of 2 starting from $(V_{dd}-V_{ss})*2^{-1}$ for the first capacitor $C_1$, $(V_{dd}-V_{ss})*2^{-2}$ for the second capacitor $C_2$, and so on up to $(V_{dd}-V_{ss})*2^{-N}$ for the Nth capacitor $C_N$; and where the network of switched capacitors is capable of creating between the tracking power supply output terminals at least any of the following combination of the supplies and capacitors:

$$\pm(A_0*(V_{dd}-V_{ss})+A_1*C_1+A_2*C_2+\ldots+A_n*C_N)$$

Where $A_1, \ldots A_N$ are any of −1 or 0 or 1

And where $A_0$ is either 0 or 1

Than it can be proven that with the above network, and given the restrictions of the targeted capacitor selection algorithm, in all cases any level between $-(V_{dd}-V_{ss})$ and $(V_{dd}-V_{ss})$, in increments of $(V_{dd}-V_{ss})*2^{-N}$ can be created up to the target errors. This is easily proven by observing that any voltage $(V_{dd}-V_{ss})*2^{-N}$ can be generated either by using directly the capacitor $C_n$ (in which case the capacitor $C_m$ will discharge), or by using $C_{(m-1)}-C_n$ where n>1, or $(V_{dd}-V_{ss}-C_1)$ where n=1 (in which case the capacitor $C_n$ will charge). This provides a behavior similar to that of a quantizer with N+1 bits. By adding the voltages $(V_{dd}-V_{ss})*2^{-n}$, any level close to $\pm K*(V_{dd}-V_{ss})*2^{-N}$ can be generated, with an error related to the target error.

Proof:

To simplify, relate to the case where $(V_{dd}-V_{ss})=1$, and to the target error as 0. Denote the 1-bit state for the mth capacitor by $S_n$, where $S_n=1$ means that the voltage across the capacitor is above the target voltage, and where $S_n=0$ means that the voltage is below the target voltage. $S_0$ stands for the logical 1-bit state of the positive supply $V_{dd}$, and is by definition always 1 (this manifests the fact that the supply always supplies current to charge the capacitors).

First, relating only to positive quantization levels, find the binary representation: $K*2^N=B=(B_0*2^0+B_1*2^{-1} \ldots B_N*2^{-N})$, where $0 \leq K \leq 2^N$, and $B_n \ldots B_N$ are 0 or 1. If the 1-bit state of all capacitors allows them to discharge, then generating any such value can be done simply by cascading the capacitors whose corresponding bit $B_n$ is 1. For the generic case where the 1-bit states are arbitrary, the following algorithm will find how to generate the desired output while conforming to the targeted capacitors selection algorithm:

For each bit $B_n$, starting from the least significant bit $B_N$ to $B_0$ compute $A_n$ recursively as follows.

(1) If ($B_n=0$) then $A_n=0$.

(2) If ($B_n=1$ and $S_n=1$) then $A_n=1$;

(3) If ($B_n=1$ and $S_n=0$) then $A_n=-1$; $B=B+2^{n+1}$.

At the end of this procedure we will get $A_0$ to $A_N$ as defined above.

Where $A_1 \ldots A_N$ are any of −1, 0, or 1; and where $A_0$ is either 0 or 1.

The control logic should create a network connection cascading the capacitors according to their respective coefficients $A_n$. When $A_n=0$ the corresponding capacitor is not used when $A_n=1$ the corresponding capacitor is cascaded with positive polarity, and when $A_n=-1$ the corresponding capacitor is cascaded with negative polarity. Finally, the sign of the desired output can be applied by connecting the network's output terminals according to the desired polarity. This completes the proof.

Furthermore, it can be shown that the above proof can be generalized such that the same results can be achieved with the target for the capacitor $C_n$ being of the more general form $M*(V_{dd}-V_{ss})*2^{-n}$ where M is any odd integer.

Target Function

As noted previously, a target function should be provided for determining the output of the tracking power-supply in order that the tracking power-supply will be able to accurately track the output requirements. In an embodiment of the present invention that uses a linear voltage regulator at the final output, the target function $V_P$ needs to take in account the margin required for operation of the linear voltage regulator.

Network State Estimation

In several embodiments according to the present invention, the network state is estimated by measuring voltages across capacitors through the sensor. The measurement can be done, for example, using a simple 1-bit state as described for the case of targeted capacitors, or using an A-to-D converter. In other embodiments, a goal is to minimize the amount of information sampled through the A-to-D converter. Since not all capacitors change voltage during every time interval, it is sufficient to monitor and update the state of each capacitor only when there is an actual change. Furthermore, it is also possible to monitor the state of each capacitor only once every few changes. Between monitoring operations, the state of the capacitor can be estimated. During such times that the capacitor's state is estimated, the control logic operates according to the estimated network state. Estimates may be based on knowledge of network parameters such as the primary power supplies, the capacitance of each capacitor, the impedance of the output load, and the length of time during which the capacitor was used.

Network parameters may either be supplied to the control logic by the user, or may be measured and estimated by the control logic. To do this, the control logic can create a desired network connection with known initial conditions, and monitor the final conditions after some time interval. This can be done during a dedicated initialization time and/or during operation.

Embodiment of the Network of Switched Capacitors

FIG. 5 shows an embodiment of the network of switched capacitors according to the present invention.

The embodiment illustrated in FIG. 5 uses several techniques to simplify implementation of a power supply according to the present invention. These techniques include:

Applying the targeted capacitor selection algorithm.

Using the 1-bit state from comparators 501A–C by the control logic as an input to the selection algorithm.

Using the 1-bit state from comparators 501A–C to estimate the voltage over each capacitor, for use by the control logic and possibly also by the noise shaping loop.

Implementing the targeted capacitors selection algorithm is simple, because only a 1-bit state value is needed to represent whether the capacitor's voltage is above or below the target voltage. This 1-bit state can be derived easily in the analog domain for example by using the comparators, where the target voltage is created by using the resistor network, or any other suitable arrangement. This 1-bit state can be directly available for use in the digital domain.

As explained above, a corollary of the targeted capacitor selection algorithm is that the target voltage for a capacitor is a good estimate of the average output voltage from the comparator.

Given the estimated voltages on each capacitor, the control logic can select the best possible configuration of switches, subject to the restrictions of the selection algorithm. Once the selection is made, the control logic can also compute the estimated output voltage across the output terminals, using the same estimated voltages one each capacitor. This estimated output voltage can then be used in the digital domain by the noise-shaping loop. The error resulting from performing noise shaping according to an estimated output voltage rather than the exact output voltage can be shown to be an additive error whose magnitude is related to the target error.

The Network of Switched Capacitors of FIG. 5, is capable to implement both the Linear Quantizer and Binary Quantizer described above.

Generating the 1-Bit State with Floating Capacitors

In order to achieve the greater connection flexibility of the network illustrated in FIG. 5, the capacitors are not permanently connected to $V_{ss}$, and are thus floating. Comparing a floating voltage is more complex than comparing a referenced voltage and there are several alternatives to perform this task. One alternative is to use an additional buffer which is a true floating differential buffer, around each capacitor to extract the voltage thereon and feed that voltage to the comparator. Such buffers are more complex and expensive to make, especially in an ASIC environment.

An alternative method, suitable for the network of FIG. 5 as illustrated, is for the control logic to utilize the 1-Bit State output of the comparators only during a monitoring time interval. In the case of FIG. 5, a monitoring time interval takes place whenever the side of the capacitors that is not connected to the comparator, is connected to Vss through the switch 502B. One way to achieve this is by a dedicated, short duration, monitoring time interval that is not a load time interval, during which the switch 165-1 is closed and all the load switched 502D and 502E are disconnected.

Another way to achieve this is without using a dedicated monitoring time interval, but rather whenever a load time interval happens to also be a monitoring time interval. Because the control logic is aware of the network connection at any moment, it can be known, at any time interval, whether that time interval is suitable for monitoring or not (that is, whether is the switch 502B closed or not). Although a monitoring time interval does not take place during a load time interval, a monitoring time interval takes place from time to time as a consequence of the selection algorithm. Because the control logic is aware of this fact, it is possible to monitor the 1-bit state of the comparators. It is to be noted that with the circuit of FIG. 16, once a monitoring time interval takes place, the 1-bit state of all capacitors can be monitored at once. At load time intervals between two monitoring time intervals, the state of each capacitor can be estimated according to knowledge of the network parameters. In the case of targeted capacitors selection algorithm, the best estimate of the 1-bit state of a capacitor is that the 1-bit state toggles after each time interval during which the capacitor is used.

Implementation of the Control Logic

An embodiment of control logic suitable for the embodiments of the present invention illustrated in FIG. 5 is described here by way of a non-limiting example. This embodiment implements the targeted capacitors selection algorithm, and use a 1-bit state to describe the state of each capacitor. The control logic is also aware of the target voltage of each capacitor, for example by their order. The control logic relates to the network of switched capacitors as a quantizer with $2^{(N+1)}$ quantization levels, capable of producing an output voltage of the form $\pm K^*(V_{dd}-V_{ss})/(2^{(N+1)})$. Thus the first action performed by the control logic is to determine which of the possible quantization levels minimizes the target function. The second action is to determine the network connection that will give rise to this quantization level, while conforming to the targeted capacitor selection algorithm, given the 1-bit state of each capacitor. Two possible implementations of this second action are given here as non-limiting examples. The first possibility is to perform, in real time, the algorithm described in the $2^{(N+1)}$ level quantizer proof, as detailed previously. The second possibility is to use a pre-computed lookup table. Taking the N+1 bit binary representation of the quantization level found in step one above, and concatenating thereto the N 1-bit states from all capacitors will result in a 2*N+1 bit integer. This integer can be used to index a lookup table, where, at each entry of the lookup table is the pre-computed $A_n$ parameters described previously, corresponding to the respective quantization level and 1-bit states.

Control Logic Example

Figure 6A:
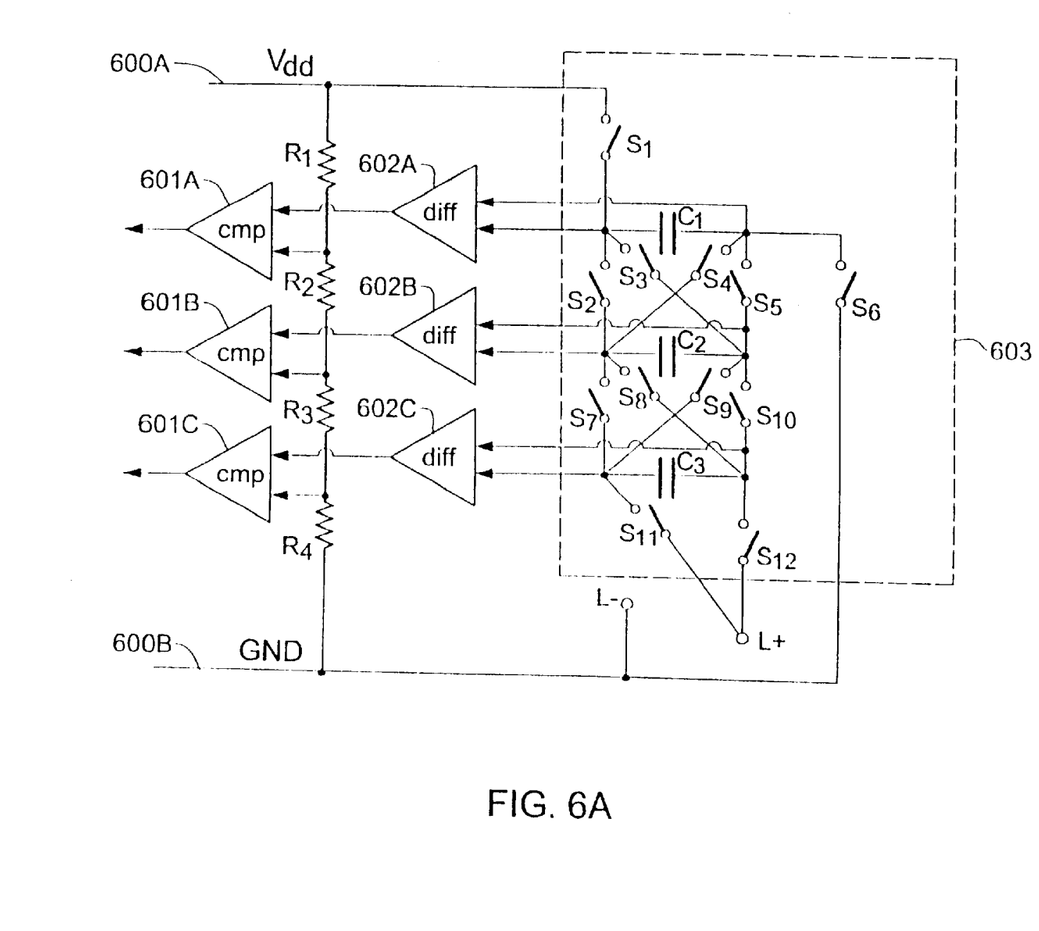
FIG. 6A shows a block diagram of a generic Network of Switched Capacitors according to the invention.

FIG. 6A shows a circuit similar to FIG. 5, this time using differential buffers 602A–602C to monitor the voltage over the floating capacitors C1–C3. By way of example consider the case where the desired output voltage is Vdd*5/8. Using the Binary Quantizer with 3 capacitors we can reach resolution of Vdd*1/8. By setting the values of R1 to R4 such that R2=0.5*R1, R3=R4=0.25*R1, the cascade of resistors R1–R4 generates the target voltages per each of the capacitors. The voltage between R1 and R2 will be 0.5*Vdd and is the target for C1, the voltage between R3 and R3 will be 0.25*Vdd and is the target for C2, and the voltage between R3 and R4 will be 0.125*Vdd and is the target for C3. The 1-bit State of comparators 601A–601C will indicate weather the voltage over each capacitor is above or bellow it's target voltage. Assuming that the voltage over each capacitor equals it's target voltage, it can be seen that there are at least 3 different circuits that can generate the voltage difference Vdd*0.625 at the load terminals, namely:

0.625=0.5+0.125=(C1+C3), 0.625=0.5+0.25−0.125=(C1+C2−C3), 0.625=1−0.5+0.125=(Vdd−C2−C3), 0.625=1−0.5+0.125=(Vdd−C1+C3) and 0.625=1−0.5+0.25−0.125=(Vdd−C1+C2−C3).

Figure 6B:
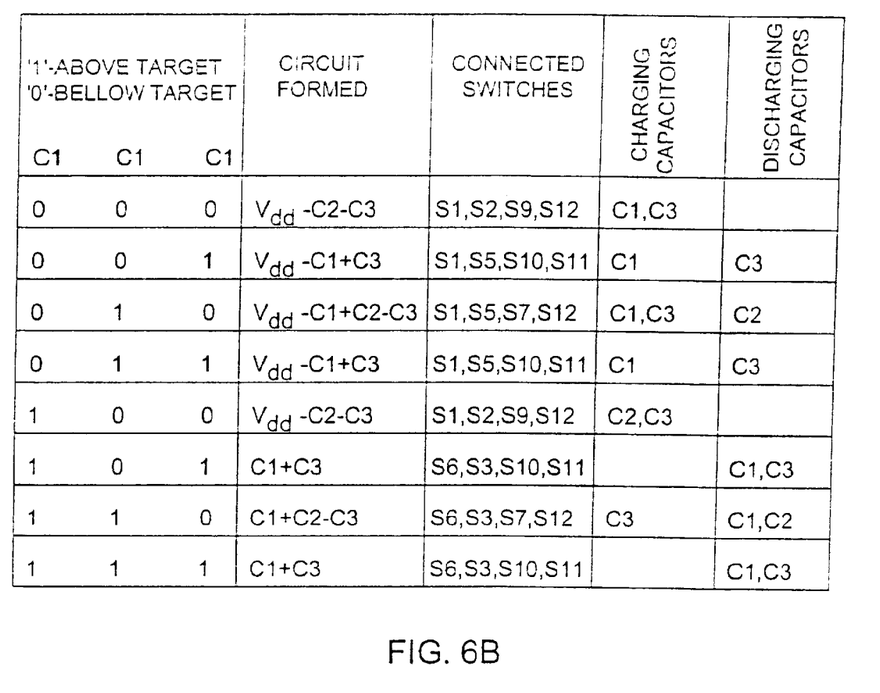
FIG. 6B shows a table with the 8 possible 1-bit states of the circuit in FIG. 6A, and the corresponding Network connections to provide an output that is Vdd*5/8.

The 3 1-bit states at the output of the comparators 601A–C can be in one of 8 possible states. For this example we assume that a 1-bit state of '1' indicates the capacitor is above its target voltage, and '0' indicates that capacitor is bellow its target voltage. The table in FIG. 6B summarizes the different Network Connections that will provide the desired output per each possible state of the comparators. The first column of FIG. 6B shows the 8 possible comparators states. The second column of FIG. 6B indicates the corresponding combinations of Vdd and capacitors that will yield the desired output, while conforming to the Targeted Capacitors Selection Algorithm. The third column of FIG. 6B indicates which of the switches S1–S12 is connected in order to achieve the corresponding circuit. The last two columns of FIG. 6B indicates which capacitors will charge or discharge per each of the Network Connections, note that capacitors which appear in the second column with a negative sign will charge, and capacitors which appear in the second column with a positive sign will charge.

Network State Initialization

In general, the initial conditions of the network state will not be those of the steady state. For example, in the case of targeted capacitors selection algorithm, the initial voltage on each capacitor may be far from the target voltage. In the case of the targeted capacitors selection algorithm, after a short time the network of switched capacitors will reach steady-state, where the voltage over each capacitor is close to the respective target voltage. During this short time the target error will be much larger than during the steady state. For example, if all capacitors are initially completely discharged, the targeted capacitors selection algorithm will only let the capacitors charge until they reach their target voltage. In cases where this initial short time must be minimized, it is possible to pre-charge the capacitors to some good initial conditions.

While the invention has been described with respect to a limited number of embodiments, it will be appreciated that many variations, modifications and other applications of the invention may be made.

I claim:

1. A power supply receiving electrical energy from a primary source of electrical energy having a $V_{ss}$ source voltage and a $V_{dd}$ source voltage, and supplying output power via load terminals, the power supply comprising a Control Logic unit having control outputs, and a Network of Switched Capacitors containing at least one capacitor for storing electrical energy, each of said at least one capacitor having a voltage thereon, wherein said Network of Switched Capacitors is operative to configuring electrical circuits between said load terminals such that said at least one capacitor substantially charge or discharge only trough said load terminals, and wherein said electrical circuits include at least one member selected from a group containing i) the $V_{ss}$ source voltage,
ii) the $V_{dd}$ source voltage, and
iii) a non-negative number of capacitors of said Network of Switched Capacitors;

and said control logic unit is operative to controlling said network of switched capacitors, wherein said Control Logic is responsive to a Selection Algorithm and is furthermore responsive to at least one signal taken from a group containing i) the source voltage $V_{ss}$,
ii) the source voltage $V_{dd}$,
iii) an estimate of the source voltage $V_{ss}$,
iv) an estimate of the source voltage $V_{dd}$,
v) the voltage on said at least one capacitor,
vi) an estimate of the voltage on said at least one capacitor,
vii) the voltage difference at said load terminals, and
viii) an estimate of the voltage difference at said load terminals, and wherein said Control Logic is operative to creating a desired voltage difference at the load terminals.

2. The power supply of claim 1, further comprising at least one target voltage, and wherein said estimate of the voltage on at least one of said capacitors is determined by a comparison of the voltage on said at least one capacitor with said at least one target voltage.

3. The power supply of claim 2, wherein said Network of Switched Capacitors has a state, and wherein said estimate of said voltage difference at the load terminals is calculated according to said estimate of the voltage on said at least one capacitor and said state of said Network of Switched Capacitors.

4. The power supply of claim 3, further comprising at least two internal voltage sources $V_{i1}$ and $V_{i2}$ taken from a group containing $V_{ss}$, $V_{dd}$ and any other voltage generated internally within the power supply, and where said at least one capacitor comprises at least one group of N capacitors $C_1 \ldots C_N$ and said at least one target voltage comprises at least one group of N target voltages $T_1 \ldots T_N$ wherein $T_1 \ldots T_N$ are distributed between $V_{i1}$ and $V_{i2}$ according to the equation:

$$T_n = V_{i1} + n*(V_{i2}-V_{i1})/(N+1); \text{ for } n=1 \ldots N;$$

and where said Selection Algorithm is operative to keep the voltage over each capacitor $C_n$ close to the target voltage $T_n$.

5. The power supply of claim 3, further comprising at least two internal voltage sources $V_{i1}$ and $V_{i2}$ taken from a group consisting $V_{ss}$, $V_{dd}$ and any other voltage generated internally within the power supply, and where said at least one capacitor comprises at least one group of N capacitors $C_1 \ldots C_N$ and said at least one target voltage comprises at least one group of N target voltages $T_1 \ldots T_N$, wherein $T_1 \ldots T_N$ are distributed between $V_{i1}$ and $V_{i2}$ according to the equation:

$$T_n = V_{ss} + 2^{-n}*(V_{dd}-V_{ss}); \text{ for } n=1 \ldots N;$$

and where said Selection Algorithm is operative to keep the voltage over each capacitor $C_n$ close to the target voltage $T_n$.

6. The power supply of claim 1, where said Control Logic has a control input, and is also responsive to this control input.

7. A power supply according to claim 6, further comprising a noise-shaping loop having a second input terminal, a third input terminal, and an output terminal for supplying a shaped signal, wherein said second input terminal receives the desired output voltage, wherein said third input terminal receives a signal taken from a group containing:

(a) said voltage difference at the load terminals, and
(b) an estimate of said voltage difference at the load terminals, and wherein said shaped signal is said control input.

8. The power supply of claim 5, wherein said Control Logic has a control input, and is also responsive to this control input, further comprising a noise-shaping loop having a second input terminal, a third input terminal, and an output terminal for supplying a shaped signal, wherein said second input terminal receives the desired output voltage, wherein said third input terminal receives a signal taken from a group containing:

(c) said voltage difference at the load terminals, and
(d) an estimate of said voltage difference at the load terminals, and wherein said shaped signal is said control input.

9. A power supply receiving electrical energy from a primary source of electrical energy having $V_{ss}$ source voltage and a $V_{dd}$ source voltage, and supplying output power via load terminals, the power supply comprising:

(a) a Control Logic unit having control outputs,
(b) a Network of Switched Capacitors containing at least on group of N>2 capacitors $C_1 \ldots C_N$ for storing electrical energy, each of said at least two capacitors having a voltage thereon,
(c) at least two internal voltage sources $V_{i1}$ and $V_{i2}$ taken from a group containing $V_{ss}$, $V_{dd}$ and any other voltage generated internally within the power supply, and
(d) at least one group of N target voltages $T_1 \ldots T_N$, wherein $T_1 \ldots T_N$ are distributed between $V_{i1}$ and $V_{i2}$ according to the equation:

$$T_n = V_{ss} + M*2^{-n}*(V_{dd}-V_{ss}); \text{ for } n=1 \ldots N; \text{ M odd integer}$$

wherein said Network of Switched Capacitors is operative to dynamically configuring electrical circuits between said load terminals such that each of said at least two capacitors substantially charges or discharges only through said load terminals, and wherein said dynamically configured electrical circuits include at least, a) the $V_{ss}$ source voltage,
b) source voltage being at least one of $V_{dd}$, $V_{i1}$ and $V_{i2}$,
c) at least two capacitors of said Network of Switched Capacitors;

and said control logic unit is operative to controlling said network of switched capacitors, wherein said Control Logic is responsive to a Selection Algorithm and is furthermore responsive to at least one signal taken from a group containing a) the source voltage $V_{ss}$,
b) the source voltage $V_{dd}$,
c) an estimate of the source voltage $V_{ss}$,
d) an estimate of the source voltage $V_{dd}$,
e) the internal voltage sources $V_{i1}$,
f) the internal voltage sources $V_{i2}$,
g) an estimate of the internal voltage sources $V_{i1}$,
h) an estimate of the internal voltage sources $V_{i2}$,
i) the voltage on said at least one capacitor;
j) an estimate of the voltage on said at least one capacitor,
k) the voltage difference at said load terminals, and
l) an estimate of the voltage difference at said load terminals, and wherein said Control Logic is operative to creating a desired voltage difference at the load terminals, and wherein said Selection Algorithm is operative to keep the voltage over each capacitor $C_n$ close to the target voltage $T_n$.

10. The power supply of claim 9, where said estimate of the voltage on at least one of said capacitors is determined by a comparison of the voltage on said at least one capacitor with said at least one target voltage.

11. The power supply of claim 9, wherein said Network of Switched Capacitors has a state, and wherein said estimate of said voltage difference at the load terminals is calculated according to said estimate of the voltage on said at least one capacitor and said state of said Network of Switched Capacitors.

12. The power supply of claim 9, where said Control Logic has a control input, and is also responsive to this control input.

13. The power supply according to claim 12, further comprising a noise-shaping loop having a second input terminal, a third input terminal, and an output terminal for supplying a shaped signal, wherein said second input terminal receives the desired output voltage, wherein said third input terminal receives a signal taken from a group containing:

(a) said voltage difference at the load terminals, and
(b) an estimate of said voltage differences at the load terminals, and wherein said shaped signal is said to control input.

* * * * *